(12) United States Patent
Okazawa et al.

(10) Patent No.: US 9,467,629 B2
(45) Date of Patent: Oct. 11, 2016

(54) IMAGE PROCESSING APPARATUS AND IMAGE PROCESSING METHOD

(71) Applicant: OLYMPUS CORPORATION, Tokyo (JP)

(72) Inventors: Atsuro Okazawa, Hino (JP); Teruaki Yamasaki, Hino (JP); Takeshi Fukutomi, Hachioji (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/507,178

(22) Filed: Oct. 6, 2014

(65) Prior Publication Data
US 2015/0097992 A1    Apr. 9, 2015

(51) Int. Cl.
| H04N 5/243 | (2006.01) |
| H04N 5/217 | (2011.01) |
| H04N 5/232 | (2006.01) |
| H04N 5/369 | (2011.01) |
| H04N 9/04 | (2006.01) |

(52) U.S. Cl.
CPC ............. *H04N 5/243* (2013.01); *H04N 5/217* (2013.01); *H04N 5/23212* (2013.01); *H04N 5/3696* (2013.01); *H04N 9/045* (2013.01)

(58) Field of Classification Search
CPC .. H04N 5/217; H04N 5/23212; H04N 5/243; H04N 5/3696; H04N 9/045; H04N 9/73
See application file for complete search history.

(56) References Cited

U.S. PATENT DOCUMENTS

| 2010/0165176 | A1* | 7/2010 | Taniguchi | G02B 7/34 348/345 |
| 2010/0289929 | A1* | 11/2010 | Ohwa | G03B 15/05 348/241 |
| 2012/0105688 | A1* | 5/2012 | Kita | H04N 5/359 348/242 |
| 2012/0154637 | A1* | 6/2012 | Hara | H04N 5/23212 348/239 |
| 2012/0327267 | A1* | 12/2012 | Takahara | G02B 7/34 348/231.99 |
| 2013/0088621 | A1* | 4/2013 | Hamada | H04N 5/3696 348/281 |
| 2013/0107067 | A1* | 5/2013 | Miyakoshi | H04N 5/23212 348/208.5 |
| 2013/0335606 | A1* | 12/2013 | Aoki | G02B 7/34 348/296 |
| 2014/0022359 | A1* | 1/2014 | Misawa | G03B 35/08 348/49 |
| 2014/0028881 | A1* | 1/2014 | Miyatani | H04N 5/367 348/246 |
| 2014/0072290 | A1* | 3/2014 | Miyatani | G03B 13/36 396/104 |

FOREIGN PATENT DOCUMENTS

| JP | 3592147 | 11/2004 |
| JP | 2010-062640 | 3/2010 |

* cited by examiner

*Primary Examiner* — Amy Hsu

(74) *Attorney, Agent, or Firm* — Ostrolenk Faber LLP

(57) ABSTRACT

An image processing apparatus is designed to process pixel outputs of an imaging element including imaging pixels and phase-difference detecting pixels. The apparatus includes a pixel mixing unit and an image processing unit. The pixel mixing unit mixes the pixel outputs. The image processing unit corrects the pixel outputs to prevent the phase-difference detecting pixels from degrading image quality, by using at least one of information selected from a group consisting of the number of mixed pixel outputs of phase-difference detecting pixels having the same opening direction and the number of mixed pixel outputs of imaging pixels having the same opening direction.

11 Claims, 5 Drawing Sheets

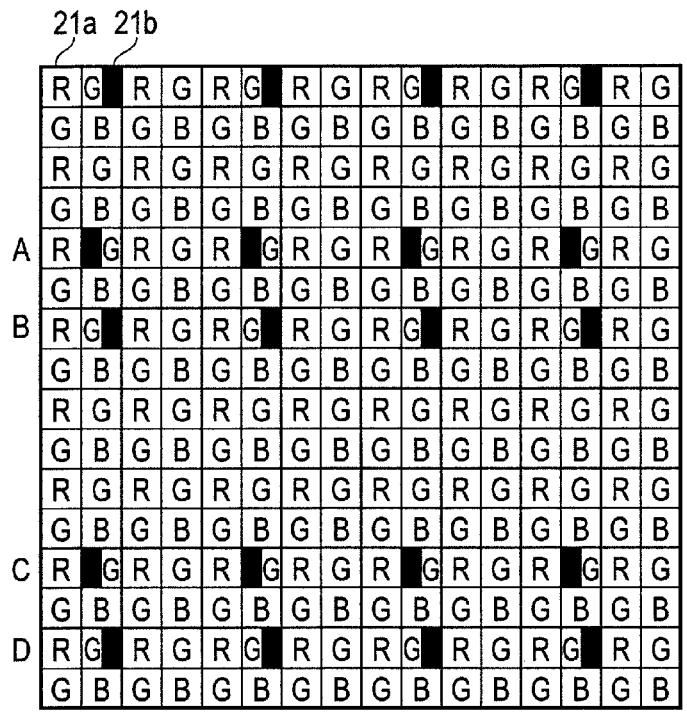
F I G. 2
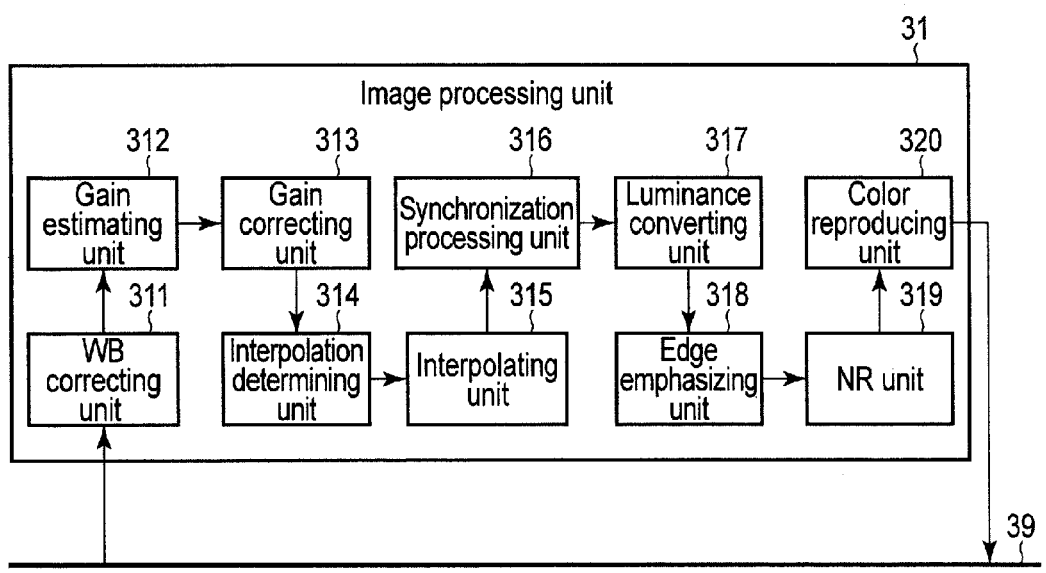
F I G. 3

F I G. 7A

F I G. 7B

F I G. 8A

F I G. 8B

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2013-212284, filed Oct. 9, 2013, the entire contents of which are incorporated herein by reference.

BACKGROUND OF THE INVENTION

1. Field of the Invention

This invention relates to an image processing apparatus and an image processing method, both designed to process the pixel outputs of an imaging element, in which some pixels are used as focal point detecting pixels of the phase-difference type.

2. Description of the Related Art

An imaging apparatus that utilizes some of the pixels of an imaging element as phase-difference detecting pixels is proposed in, for example, Japanese Patent No. 3592147. In the imaging apparatus proposed in Japanese Patent No. 3592147, some of the pixels of the imaging element are used as phase-difference detecting pixels, and light beams coming from an object through different pupil regions symmetric to the optical axis of the photographing lens are focused at the phase-difference detecting pixels. The phase-difference detecting pixels therefore detect the phase difference between the light beams, thereby determining the focusing state of the photographing lens.

Each phase-difference detecting pixel is shielded from light, for example at one part, and receives only one of the light beams coming through the different pupil regions of the photographing lens. Such phase-difference detecting pixels are inevitably defective, and cannot be used to form an image. In the imaging apparatus proposed in Jpn. Pat. Appln. KOKAI Publication No. 2010-062640, the outputs of the phase-difference detecting pixels are therefore adjusted in terms of gain or are interpolated by using the signals output from the pixels adjacent to the phase-difference detecting pixels, and can then be used to record or display images.

BRIEF SUMMARY OF THE INVENTION

According to a first aspect of the invention, there is provided an image processing apparatus designed to process pixel outputs of an imaging element including imaging pixels and phase-difference detecting pixels, the apparatus comprising: a pixel mixing unit configured to mix the pixel outputs; and an image processing unit configured to correct the pixel outputs to prevent the phase-difference detecting pixels from degrading image quality, by using at least one of information selected from a group consisting of the number of mixed pixel outputs of phase-difference detecting pixels having the same opening direction and the number of mixed pixel outputs of imaging pixels having the same opening direction.

According to a second aspect of the invention, there is provided an image processing method designed to process pixel outputs of an imaging element having imaging pixels and phase-difference detecting pixels, the method comprising: mixing the pixel outputs; and correcting the pixel outputs to prevent the phase-difference detecting pixels from degrading image quality, by using at least one of information selected from a group consisting of the number of mixed pixel outputs of phase-difference detecting pixels having the same opening direction and the number of mixed pixel outputs of imaging pixels having the same opening direction.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing the pixel arrangement in an imaging element;

FIG. 3 is a diagram showing, in detail, the configuration of the image processing unit incorporated in the digital camera;

FIG. 5A is a diagram showing how an image is focused at an imaging pixel 21a;

FIG. 7A is a diagram showing how the pixels are arranged before a 2×2 pixel-mixture reading;

FIG. 7B is a diagram showing how the pixels are arranged after the 2×2 pixel-mixture reading;

FIG. 8A is a diagram showing how pixels are arranged before the 3×3 pixel-mixture reading.

FIG. 8B is a diagram showing how the pixels are arranged after 3×3 pixel-mixture reading.

DETAILED DESCRIPTION OF THE INVENTION

An embodiment of this invention will be described below, with reference to the accompanying drawings.

Figure 1:
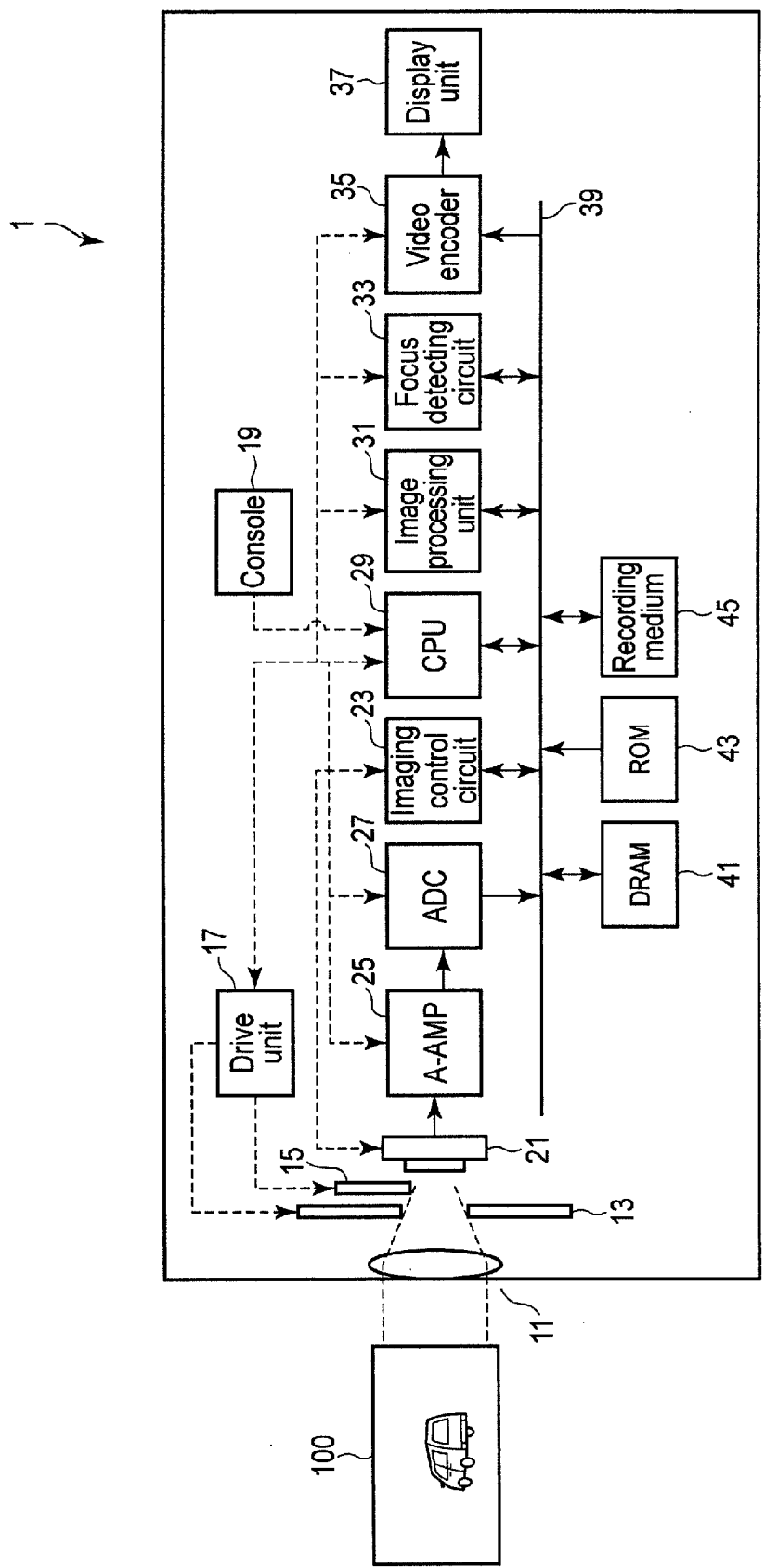
FIG. 1 is a block diagram showing the configuration of a digital camera that is an example of an imaging apparatus having an image processing apparatus according to one embodiment of this invention.

FIG. 1 is a block diagram showing the configuration of a digital camera (hereinafter, referred to as "camera") that is an example of an imaging apparatus having an image processing apparatus according to one embodiment of this invention. In FIG. 1, the solid-line arrows indicate the flow of data, and the broken-line arrows indicate the flow of control signals.

Camera 1 shown in FIG. 1 has a photographing lens 11, a diaphragm 13, a mechanical shutter 15, a drive unit 17, a console 19, an imaging element 21, an imaging control circuit 23, an A-AMP 25, an analog-to-digital converter (ADC) 27, a central processing unit (CPU) 29, an image processing unit 31, a focus detecting circuit 33, a video encoder 35, a display unit 37, a bus 39, a dynamic random access memory (DRAM) 41, a read only memory (ROM) 43, and a recording medium 45.

The photographing lens 11 is a photographing optical system for forming an image of an object 100 at the imaging element 21. The photographing lens 11 has a focusing lens configured to adjust the focal position, and may be configured as a zoom lens. The diaphragm 13 is arranged on the optical axis of the photographing lens 11, and has a variable aperture diameter. The diaphragm 13 controls the intensity of the light beam coming from the object 100 through the photographing lens 11. The mechanical shutter 15 is configured to open and close. The mechanical shutter 15 adjusts the time the light beam coming from the object 100 is applied to the imaging element 21 (exposure time for the imaging element 21). The mechanical shutter 15 may be a focal plane shutter or a lens shutter, both of which are well known in the art. The drive unit 17 drives and controls the photographing lens 11, diaphragm 13 and mechanical shutter 15 in accordance with control signals supplied from the CPU 29.

The console 19 includes various buttons such as a power button, a release button, a video button, a playback button, a menu button, and various operation members such as a touch panel. The console 19 detects the operation state of any operation member, and outputs, to the CPU 29, a signal showing any operation state detected. The console 19 may be operated to select the shooting mode of the camera 1. That is, the user may operate the console 19, thereby to select either the still-picture photographic mode or the video recording mode. In the still-picture photographic mode, the camera 1 photographs still pictures. In the video recording mode, the camera 1 records videos.

The imaging element 21 is arranged on the optical axis of the photographing lens 11, at the rear of the mechanical shutter 15 and at the position where the photographing lens 11 focuses the light beam coming from the object. The imaging element 21 comprises photodiodes, serving as pixels, which are arranged in a two-dimensional pattern. In this embodiment, the imaging element 21 has imaging pixels for acquiring an image to record or display, and phase-difference detecting pixels for detecting the focal point.

The photodiodes constituting the imaging element 21 generate electrical charges equivalent to the amounts of light they have received. The electrical charge each photodiode generates is accumulated in the capacitor connected to the photodiode. The charge accumulated in each capacitor is read as an image signal. In this embodiment, the imaging element 21 has different charge reading schemes. The electrical charge accumulated in the imaging element 21 is read, in accordance with a control signal coming from the imaging control circuit 23.

In front of the photodiodes constituting the pixels, a color filter of the Bayer arrangement, for example, is provided. The Bayer arrangement has lines in which R pixels and G (Gr) pixels are alternately arranged in the horizontal direction, and further has lines in which G (Gb) pixels and B pixels are alternately arranged in the horizontal direction.

The imaging control circuit 23, which functions as a pixel mixing unit, sets a drive mode for the imaging element 21 in accordance with the control signal coming from the CPU 29. The imaging control circuit 23 then controls the reading of image signals from the imaging element 21 in the reading scheme that accords with the drive mode set. It may be requested that the pixel data be read from the imaging element 21 in real time in order to display, for example, a live view or to record a video. In such a drive mode, the pixel data generated by pixels of the same color are mixed or the pixel data generated in some pixels are discarded so that the pixel data may be read at high speed. In another drive mode, it may be requested that the image should be displayed at high resolution, rather than in real time. In this drive mode, the pixel data of all pixels are read without mixing or discarding the pixel data, thereby maintaining high resolution.

Controlled by the imaging control circuit 23, the A-AMP 25 amplifies the image signal read from the imaging element 21. The ADC 27, which operates in conjunction with the imaging element 21, imaging control circuit 23, and A-AMP 25 to function as an imaging unit, converts the image signal output from the A-AMP 25 to a digital image signal (pixel data). Hereinafter, a group of pixel data will be referred to as "imaging data."

The CPU 29 controls the other components of the camera 1 in accordance with the programs stored in the ROM 43. The image processing unit 31 performs various image processes on the imaging data, generating image data. To record a still picture, for example, the image processing unit 31 processes the imaging data, generating still picture data. Similarly, to record a video, the image processing unit 31 processes the imaging data, generating video data. To display a live view, the image processing unit 31 performs a display image process, generating display image data. The configuration of the image processing unit 31 will be described later in detail.

The focus detecting circuit 33 first acquires pixel data from the phase-difference detecting pixels and then performs a known phase-difference detecting method, thereby calculating the defocus direction and defocus value from the pixel data.

The video encoder 35 receives the display image data generated in the image processing unit 31 and converts to a video signal. The video signal is input to the display unit 37. The display unit 37 displays the image represented by the video signal.

The display unit 37 is, for example, a liquid crystal display or an organic EL display, and is arranged on, for example, the back of the camera 1. The display unit 37 displays images as the video encoder 35 performs its function. The display unit 37 is used to display live views or the images already recorded.

The bus 39 is connected to the ADC 27, CPU 29, the image processing unit 31, the focus detecting circuit 33, the video encoder 35, the DRAM 41, the ROM 43, and the recording medium 45. The bus 39 functions as a transfer path for the various data generated in these components.

The DRAM 41 is an electrically programmable memory, and temporarily stores various data, such as imaging data (pixel data), record image data, display image data, and data processed in the CPU 29. To store the data temporarily, a synchronous dynamic random access memory (SDRAM) may be used. The ROM 43 is a nonvolatile memory such as a mask ROM or a flash memory. The ROM 43 stores various data such as the programs for use in the CPU 29 and the values for adjusting the camera 1. The recording medium 45 is incorporated in the camera 1 or is removably provided in the camera 1, and records the record image data in the form of an image file of a specific format.

The configuration of the imaging element 21 will be described with reference to FIG. 2. FIG. 2 shows pixels in the Bayer arrangement. However, the pixel arrangement is not limited to the Bayer arrangement. Various available arrangements can be utilized.

As described above, the imaging element 21 of the Bayer arrangement has pixel lines in which R pixels and G (Gr) pixels are alternately arranged in the horizontal direction, and pixel lines in which G (Gb) pixels and B pixels are alternately arranged in the horizontal direction. In other words, pixel sets, each consisting of four pixels, a Gr pixel, R pixel, Gb pixel, and B pixel magnified in the right part of FIG. 2, are repeatedly arranged in both the horizontal direction and the vertical direction.

In this embodiment, phase-difference detecting pixels 21b are arranged at some of the imaging pixels 21a. The phase-difference detecting pixels are pixels the left half or right half of which are covered with a shield film. In the case shown in FIG. 2, any line of phase-difference detecting pixels each having the left half covered with shield film (hereinafter called "right-open phase-difference detecting pixel") is arranged close to, in a vertical direction, a line of phase-difference detecting pixels each having the right half covered with shield film (hereinafter called "left-open phase-difference detecting pixel").

The higher the number of imaging pixels the imaging element has, the smaller the area each imaging pixel will occupy. The same image is therefore focused on any pixels adjacent to one another. This is why the phase-difference detecting pixels are so arranged as shown in FIG. 2. A phase-difference detecting pixel in row A and a phase-difference detecting pixel in row B are able to detect a phase difference. Similarly, a phase-difference detecting pixel in row C and a phase-difference detecting pixel in row D are able to detect a phase difference.

In the configuration of FIG. 2, the shielded region of any phase-difference detecting pixel is either the left half or the right half. The phase-difference detecting pixel can therefore detect a phase difference in the horizontal direction. The shielded region of any phase-difference detecting pixel may be the upper half or the lower half. The phase-difference detecting pixel can detect a phase difference in the vertical direction. The shielded region of any phase-difference detecting pixel may be an upper corner or a lower corner. In this case, the phase-difference detecting pixel can detect a phase difference in the slantwise direction. Also, the shielded region of any phase-difference detecting pixel need not be half (½) if it has a sufficient area. Additionally, a G pixel is arranged in a phase-difference detecting pixel in FIG. 2; however, a phase-difference detecting pixel may be substituted with an R pixel or B pixel. In the imaging element 21 shown in FIG. 2, a part of each phase-difference detecting pixel is shielded, thus dividing the pupil. However, it is sufficient for any phase-difference detecting pixel to receive either of two light beams coming from the object, through two different parts of the photographing lens 11, respectively. In view of this, part of the phase-difference detecting pixel may be configured to not be shielded from light, and a micro-lens may be used to divide the pupil. In the pixel arrangement of FIG. 2, the phase-difference detecting pixels are arranged at an interval of four pixels in the horizontal direction. However, the interval of arranging the phase-difference detecting pixels is not limited to this.

Since part of each phase-difference detecting pixel is shielded from light, the amount of light it receives is reduced. The amount of light reduction depends on the area and position of the shield formed on the phase-difference detecting pixel, the angle at which light is applied to the phase-difference detecting pixel, and the image height. The amount of light reduction is compensated for in the image processing unit 31.

FIG. 3 is a diagram showing in detail the image processing unit 31 incorporated in the digital camera. Any component of the camera, other than the image processing unit 31, is not illustrated in FIG. 3. As shown in FIG. 3, the image processing unit 31 has a white balance (WB) correcting unit 311, a gain estimating unit 312, a gain correcting unit 313, an interpolation determining unit 314, an interpolating unit 315, a synchronization processing unit 316, a luminance converting unit 317, an edge emphasizing unit 318, a noise reducing (NR) unit 319, and a color reproducing unit 320.

The WB correcting unit 311 amplifies each color component of the imaging data with a prescribed gain, correcting the color balance of the image represented by the imaging data.

The gain estimating unit 312 estimates the gain with which to correct the pixel output of any phase-difference detecting pixel in the gain correcting unit 313. The gain is estimated from the decrease in the amount of light received at the phase-difference detecting pixel with respect to the amount of light received at any imaging pixel. This decrease in the amount of light is calculated from the ratio of the output of the phase-difference detecting pixel to the output of an imaging pixel adjacent to the phase-difference detecting pixel. The gain correcting unit 313 corrects the pixel output of the phase-difference detecting pixel in accordance with the gain estimated in the gain estimating unit 312.

The interpolation determining unit 314 determines the application ratio of the pixel output of the phase-difference detecting pixel, the gain of which has been corrected by the gain correcting unit 313. The application ratio is the weighting coefficient used in a weighted addition, for example, adding the gain-corrected pixel data output from the phase-difference detecting pixel to the pixel data output from the pixels arranged around the phase-difference detecting pixel. The pixels around the phase-difference detecting pixel are four imaging pixels of the same color (the same component in the Bayer arrangement), which surrounds the phase-difference detecting pixel. The pixels around the phase-difference detecting pixel, of course, are not limited to four pixels. The application ratio is determined from, for example, the dispersion (standard deviation) among the pixel outputs of the imaging pixels arranged around the phase-difference detecting pixel.

The interpolating unit 315 performs interpolation (weighted addition) on the gain adjusted output of the phase-difference detecting pixel and the pixel outputs of the imaging pixels arranged around the phase-difference detecting pixel, in accordance with the application ratio determined by the interpolation determining unit 314.

The synchronization processing unit 316 converts the imaging data output through the imaging element 21 in accordance with, for example, the Bayer arrangement, in which each pixel corresponds to one color component, to image data in which each pixel corresponds to a plurality of color components. The luminance converting unit 317 converts the luminance characteristic (gamma characteristic) of the image data to a luminance characteristic appropriate for displaying and recording the image. The edge emphasizing unit 318 multiplies an edge signal extracted from the image data by, for example, a band-pass filter by an edge emphasizing coefficient. The resultant product is added to the image data, emphasizing the edge (contour) components of the image data. The NR unit 319 performs, for example, a coring process on the image data, removing noise components from the image data. The color reproducing unit 320 performs various processes on the image data, achieving desirable color reproduction. Among these processes is, for example, a color matrix calculation. In the color matrix calculation, the image data is multiplied by a color matrix coefficient that accords with, for example, the white balance mode. Furthermore, the color reproducing unit 320 corrects the saturation and hue of the image.

Figure 4A:
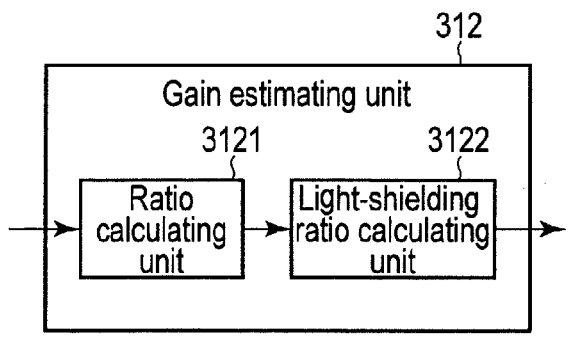
FIG. 4A is a diagram showing the configuration of the gain estimating unit incorporated in the image processing unit.

FIG. 4A is a diagram showing the configuration of the gain estimating unit 312. As shown in FIG. 4A, the gain estimating unit 312 has a ratio calculating unit 3121 and a light-shielding ratio calculating unit 3122.

The ratio calculating unit 3121 calculates the ratio of the pixel output of any phase-difference detecting pixel to the pixel output of any one of the imaging pixels arranged around the phase-difference detecting pixel, thereby calculating the amount of light that should be shielded to correct the gain of the pixel output of the phase-difference detecting pixel. The light-shielding ratio calculating unit 3122 calculates the light-shielding ratio (or light-capturing ratio) at the phase-difference detecting pixel, from the number of mixed pixel outputs of some phase-difference detecting pixels different in opening direction. This number of mixed pixel outputs accords with the read mode selected by the imaging control circuit 23 and the arrangement of the phase-difference detecting pixels in the imaging element 21. How the light-shielding ratio is calculated will be explained later in detail.

Figure 4B:
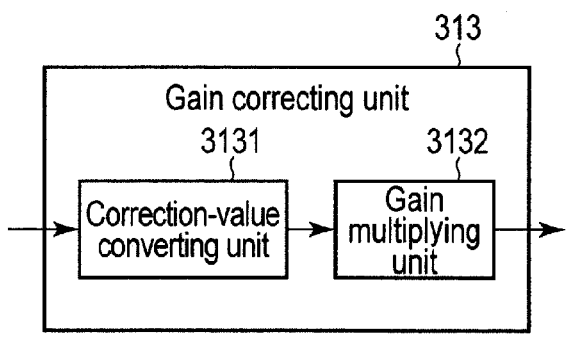
FIG. 4B is a diagram showing the configuration of the gain correcting unit incorporated in the image processing unit.

FIG. 4B is a diagram showing the configuration of the gain correcting unit 313 incorporated in the image processing unit. The gain correcting unit 313 has a correction-value converting unit 3131 and a gain multiplying unit 3132. The correction-value converting unit 3131 calculates a gain-correction value for correcting the pixel output of the phase-difference detecting pixel in accordance with the light-shielding ratio the light-shielding ratio calculating unit 3122 has calculated for each phase-difference detecting pixel that has a specific opening direction. How the gain-correction value is calculated will be explained later in detail. The gain multiplying unit 3132 multiplies the pixel output of the phase-difference detecting pixel by the gain-correction value calculated by the correction-value converting unit 3131, thereby correcting the pixel output of the phase-difference detecting pixel.

Figure 5A:
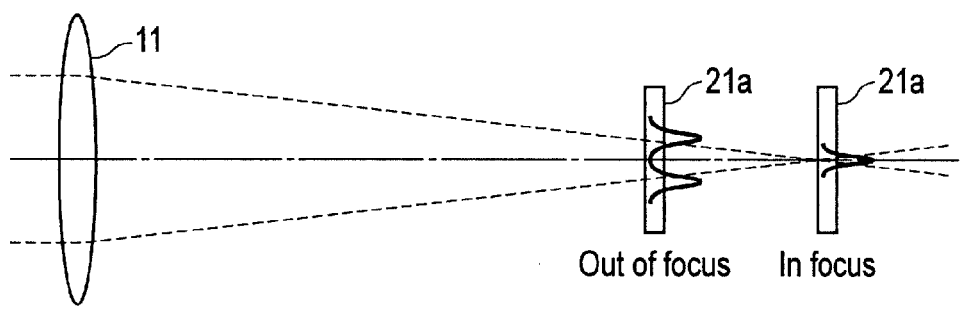
Figure 5B:
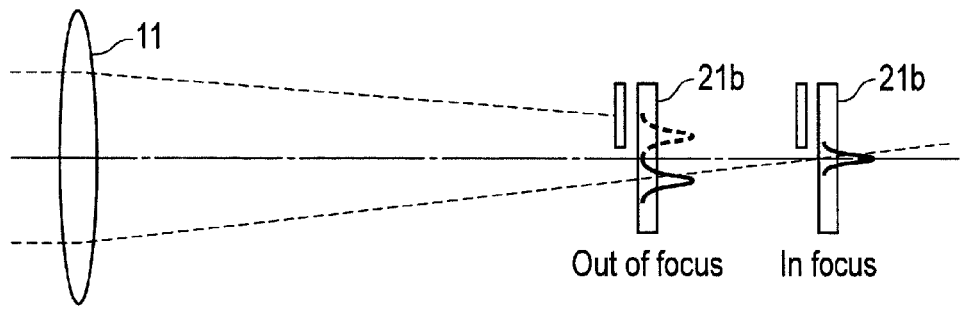
FIG. 5B is a diagram showing how an image is focused at a phase-difference detecting pixel 21b.

The phase shift that occurs in the imaging element having phase-difference detecting pixels will be explained, with reference to FIG. 5A and FIG. 5B. FIG. 5A shows how an image is focused at an imaging pixel 21*a*. FIG. 5B shows how an image is focused at a phase-difference detecting pixel 21*b*.

For the sake of simplicity of explanation, assume that the object is a point light source. Then, if the photographing lens 11 is in focus, two light beams emitted from the object and passed through different pupil regions symmetric to the optical axis of the photographing lens 11 will be focused at the same position on the imaging element 21. This means that the peak position of the image formed at the imaging pixel 21*a* coincides with the peak position of the image formed at the phase-difference detecting pixel 21*b*. To any imaging pixel 21*a*, two light beams coming from the object through the different pupil regions are applied as shown in FIG. 5A. Therefore, the light would not reduce in amount at the imaging pixel 21*a*. To any phase-difference detecting pixel, however, only one of the two light beams is applied as shown in FIG. 5B. As a result, the light reduces in amount at the phase-difference detecting pixel 21*b*.

If the photographing lens 11 is out of focus, the two light beams emitted from the object and passed through different pupil regions will be focused at different positions on the imaging element 21. In other words, the two images formed by these two light beams have a phase difference. The phase difference is detected from the correlation between the images detected at the left-open phase-difference detecting pixel and the right-open phase-difference detecting pixel. From the phase difference so detected, the defocusing value and defocusing direction of the photographing lens 11 will be determined. To any imaging pixel 21*a*, the two light beams coming from the object through different pupil regions are applied as shown in FIG. 5A. Therefore, at the imaging pixel 21*a*, the light does not reduce in amount, but the image is blurred because the light beams are applied at different positions on the imaging pixel 21*a*. To any phase-difference detecting pixel 21*b*, only one of the two light beams is applied as shown in FIG. 5B. In this case, the peak position of the image shifts from the peak position that the image assumes if the photographing lens 11 is in focus, though not making the imaging pixel 21*a* out of focus. Such a peak-position shift will be hereinafter called "phase shift." If a phase shift occurs during video recording or live-view displaying, it will be observed as moire in the image. The influence the moire imposes on the image is eliminated in the image processing unit 31.

Figure 6:
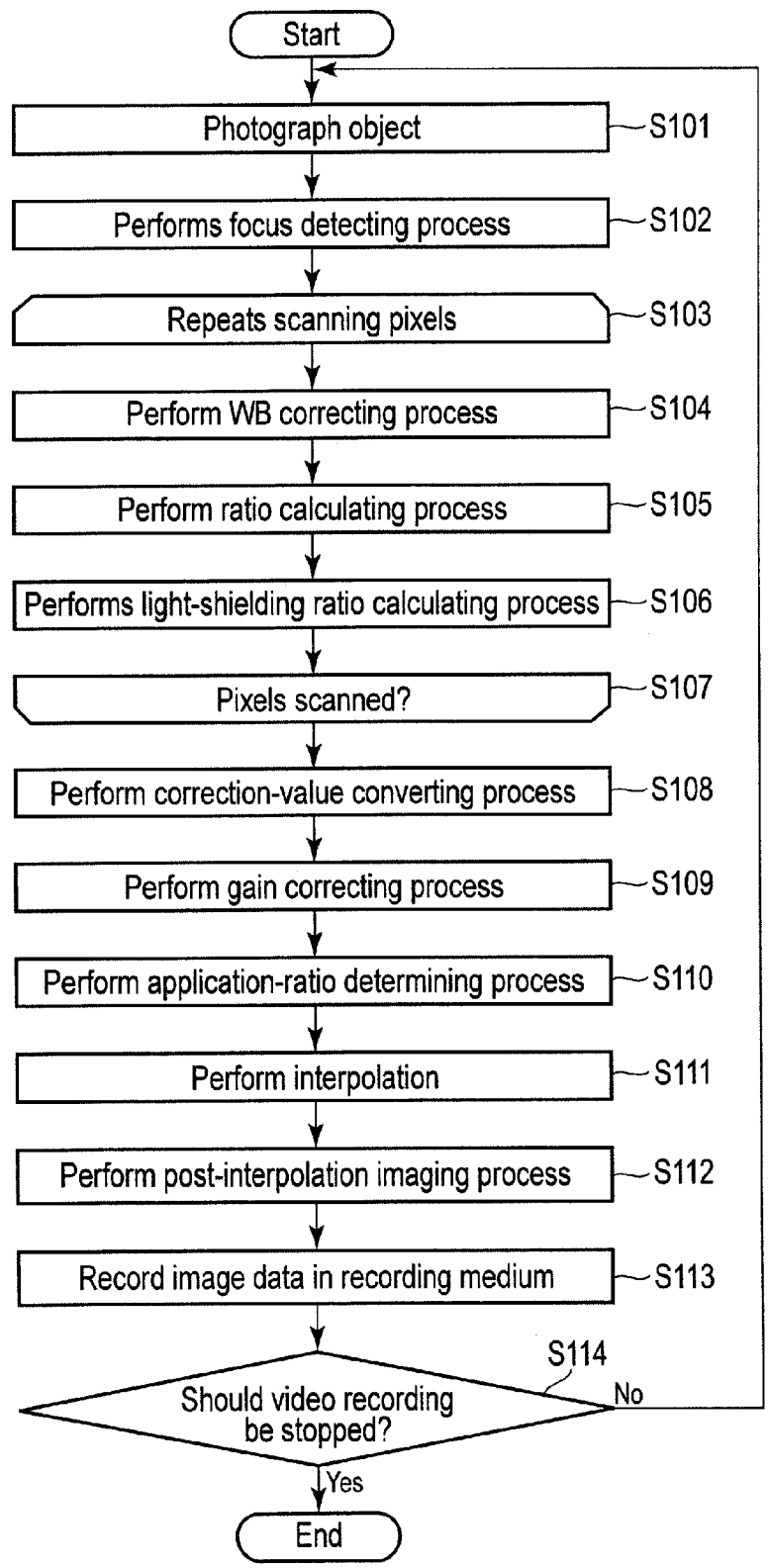
FIG. 6 is a flowchart showing the video recording process performed by an imaging processing apparatus.

How the imaging apparatus according to this embodiment operates will be explained below. FIG. 6 is a flowchart showing the video recording process performed by the imaging processing apparatus. The processes shown in the flowchart of FIG. 6 are performed by the CPU 29 in accordance with the programs stored in the ROM 43. The process sequence shown in FIG. 5 can be applied to record a still picture and to record a live view.

At the start of the operation sequence of FIG. 6, the CPU 29 causes the imaging element 21 to photograph (perform exposure) the object, generating an image signal (Step S101). The image signal is read from the imaging element 21 in a reading scheme according to a preset drive mode. The image signal thus read is amplified by the A-AMP 25, converted to digital data in the ADC 27, and temporarily stored as imaging data, in the DRAM 41.

Next, the CPU 29 performs a focus detecting process (Step S102). Here, the CPU 29 causes the focus detecting circuit 33 to detect the focal point. In response to the instructions for the focus detecting process, the focus detecting circuit 33 reads, from the imaging data temporarily stored in the DRAM 41, the pixel data pertaining to any phase-difference detecting pixel. From this pixel data, the defocus direction and defocus value of the photographing lens 11 are calculated by the known phase-difference detecting method. Then, the CPU 29 controls the drive unit 17 in accordance with the defocus direction and defocus value of the photographing lens 11 which have been detected by the focus detecting circuit 33, thus achieving focusing of the photographing lens 11.

After achieving focusing, the CPU 29 causes the image processing unit 31 to perform image processing. The image processing unit 31 repeats scanning of the pixels in the imaging data and selects pixel data (Step S103). The pixel scanning is performed, for example, from the upper-left pixel to the lower-right pixel.

After the image processing unit 31 selects pixel data, the WB correcting unit 311 of the image processing unit 31 corrects the white balance of the pixel data (Step S104). Step S104 of correcting white balance will be performed outside the loop process. Then, the ratio calculating unit 3121 of the gain estimating unit 312 performs a ratio calculating process (Step S105). In the ratio calculating process, the ratio calculating unit 3121 calculates the ratio of the pixel output of the phase-difference detecting pixel for which the present ratio should be calculated (or the pixel output of a pixel, which contains the pixel output of the phase-difference detecting pixel, if pixel mixing has been performed), to the pixel output of the imaging pixel around the phase-difference detecting pixel (or the pixel output of a pixel, which does not contain the pixel output of the phase-difference detecting pixel, if pixel mixing has been performed). The ratio Dif_pi of the pixel output is calculated in accordance with the following equation (1):

$$\text{Dif\_pi} = r/N \quad (1)$$

where N is the pixel output of the imaging pixel and r is the pixel output of the phase-difference detecting pixel.

After the ratio has been calculated, the light-shielding ratio calculating unit 3122 of the gain estimating unit 312 performs a light-shielding ratio calculating process (Step S106). The light-shielding ratio calculating process will be explained below. If the reading scheme of the imaging element 21 is, for example, a pixel mixing scheme or pixel discarding scheme, the pixel output of the phase-difference detecting pixel may be mixed in the pixel output read from the imaging element 21. If the pixel output of the phase-difference detecting pixel is mixed, the pixel output will be smaller than in the case where the pixel output of the only imaging pixel is mixed. In the light-shielding ratio calculating process performed in this embodiment, the light-shielding ratio of each pixel is calculated in accordance with the arrangement and reading scheme of the phase-difference detecting pixels provided in the imaging element 21. The light-shielding ratio is a value each pixel has after the pixel outputs have been mixed (namely, the reduction in light amount at any imaging pixel). Thus, the light-shielding ratio is calculated from the number of pixel outputs of phase-difference detecting pixels having the same opening direction, which are mixed in each mixed pixel output. The number of these pixel outputs is determined from the arrangement of the phase-difference detecting pixels in the imaging element 21 and the pixel-output mixing scheme (i.e., reading scheme), as will be explained below.

Figures 7A, 7B, 8A, 8B:
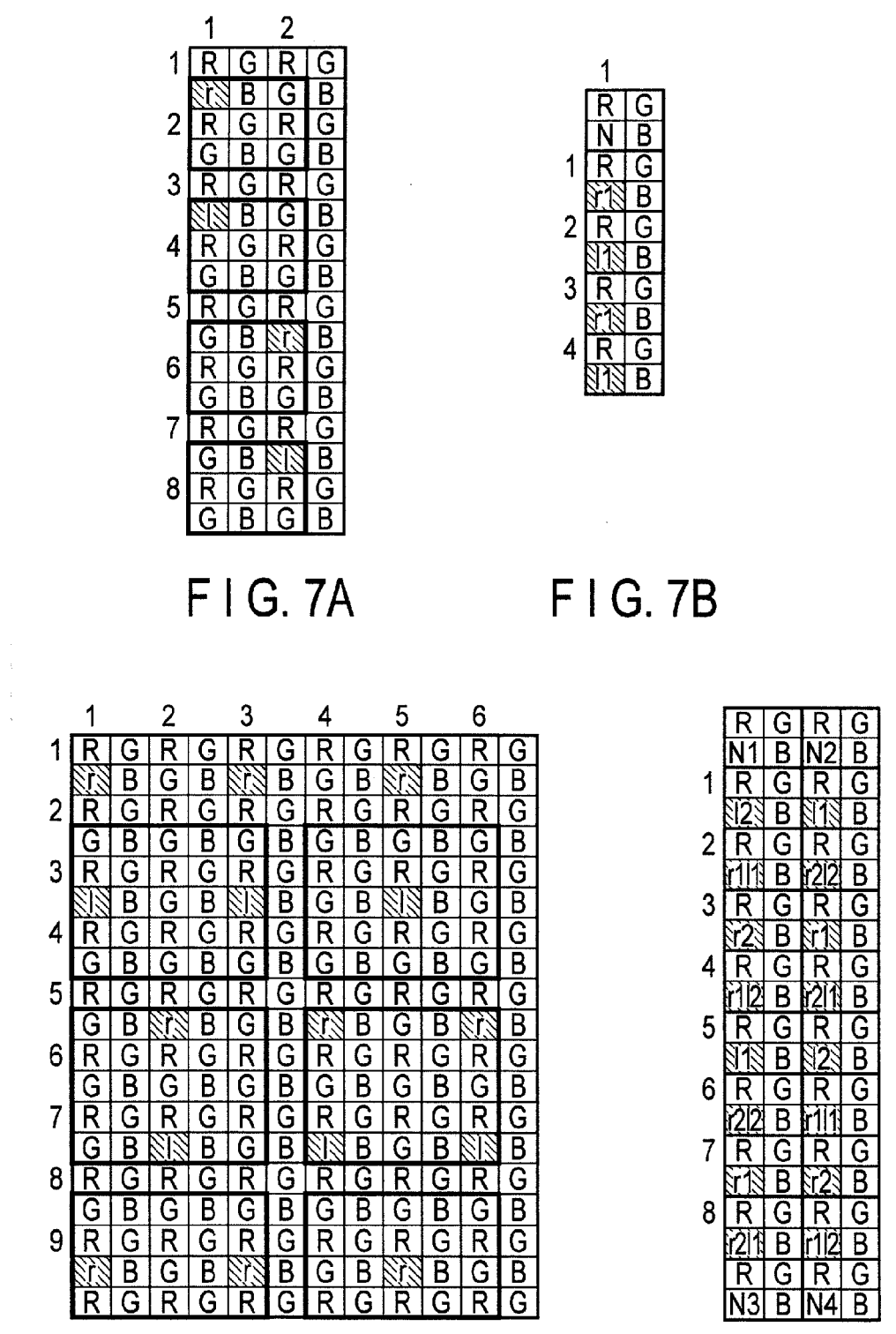

FIG. 7A is a diagram showing how the pixels are arranged before a 2×2 pixel-mixture reading. FIG. 7B is a diagram showing how the pixels are arranged after the 2×2 pixel-mixture reading. In FIG. 7A and FIG. 7B, the numbers at the upper and left sides of the tables indicate the coordinates of each pixel concerned. Hereinafter, two horizontal pixels and two vertical pixels including R pixel labeled with a number are considered identical in coordinate. In FIG. 7A, "r" indicates phase-difference detecting pixels shielded from light on the left half thereof (i.e., right-open phase-difference detecting pixels), and "1" indicates phase-difference detecting pixels shielded from light on the right half thereof (i.e., left-open phase-difference detecting pixels). In the left part of FIG. 7B, "r" means that a right-open phase-difference detecting pixel is mixed in the pixel, and "1" means that a left-open phase-difference detecting pixel is mixed in the pixel. In FIG. 7B, N indicates a pixel of the same color as pixels r and 1, in which the pixel output of the phase-difference detecting pixel is not mixed. In FIG. 7B, rx and lx (where x is one or any greater integer) indicate pixels in which the pixel output of the phase-difference detecting pixel different in the opening direction is not mixed and in which the pixel outputs of x phase-difference detecting pixels are mixed. Further, rx and lx indicate the output of pixel rx and the output of pixel lx, respectively.

To perform the 2×2 pixel-mixture reading from the pixels arranged as shown in FIG. 7A, all pixels having the same color of the data of two pixels arranged in the horizontal direction and the data of two pixels arranged in the vertical direction are mixed altogether. The mixing method is, for example, arithmetic averaging, multiplication, or arithmetic weighted averaging. The data items of four R pixels at coordinates (1,1), (1,2), (2,1), and (2,2), respectively, in the pixel arrangement of FIG. 7A, for example, are mixed, thereby obtaining the data about the R pixel at coordinates (1,1) shown in FIG. 7B. The data items of any pixels other than the R pixels are mixed in a similar manner. Assume that a phase-difference detecting pixel is arranged at the position of a G(Gb) pixel as shown in FIG. 7A. Then, the pixel output of the phase-difference detecting pixel may be mixed in the mixed pixel output of the Gb pixels at respective coordinates. For example, if the pixel outputs in the thick solid-line frames shown in FIG. 7A are mixed, the resultant mixture will contain the pixel output of the phase-difference detecting pixel. As seen from FIG. 7B, in the 2×2 pixel-mixture reading, the pixel data at each Gb position contains the pixel output of one phase-difference detecting pixel after the mixing of pixel data. Any pixel providing a pixel output mixed with the pixel output of such a phase-difference detecting pixel can be used as a phase-difference detecting pixel even after the 2×2 pixel-mixture reading.

FIG. 8A is a diagram showing how pixels are arranged before the 3×3 pixel-mixture reading. FIG. 8B is a diagram showing how the pixels are arranged after the 3×3 pixel-mixture reading. In the 3×3 pixel-mixture reading shown in FIG. 8A, all pixels having the same color of the pixel data of three pixels arranged in the horizontal direction and the pixel data of three pixels arranged in the vertical direction are mixed. For example, the data items of nine R pixels at coordinates (2,1), (2,2), (2,3), (3,1), (3,2), (3,3), (4,1), (4,2) and (4,3), respectively, in the pixel arrangement of FIG. 8A are mixed, thereby obtaining the pixel output of the R pixel at coordinates (1,1) in FIG. 8B. The pixel outputs of the pixels other than the R pixels are mixed in a similar manner. In the case shown in FIG. 8A and FIG. 8B, the outputs of the pixels of the first row are not mixed at all. Nonetheless, they may be mixed, if necessary. Assume that a phase-difference detecting pixel is arranged at the position of a G(Gb) pixel, as in the case of FIGS. 7A and 7B. Then, the pixel output of the phase-difference detecting pixel may be mixed with the pixel output obtained by mixing the data of Gb pixels at respective positions. For example, if the pixel outputs shown in any of the thick solid-line frames shown in FIG. 8A are mixed, the resultant mixture will contain the pixel output of the phase-difference detecting pixel. As seen from FIG. 8B, in the 3×3 pixel-mixture reading, the number of pixel outputs of the phase-difference detecting pixels, which are mixed, differs depending on the positions of these pixels. Further, both the pixel output of a right-open phase-difference detecting pixel and the pixel output of a left-open phase-difference detecting pixel may be mixed in some cases.

For any pixel in which the pixel output of one phase-difference detecting pixel is mixed, the light-shielding ratio calculated in Step S105 is utilized. In the 2×2 pixel-mixture reading, for example, the pixel output of any phase-difference detecting pixel may be mixed. In this case, the mixed pixel output always contains the pixel output of one phase-difference detecting pixel. The ratio calculated in Step S105 for any pixel containing the pixel output of the phase-difference detecting pixel can therefore be used as the light-shielding ratio. The light-shielding ratio LSRr1 of the pixel r1 shown in FIG. 7B, for example, is calculated in accordance with the following equation (2):

$$LSRr1 = r1/N \quad (2)$$

where r1 is the pixel output of the pixel r1 and N is the pixel output of the pixel N having the same color as the pixel r1 and arranged around the pixel r1.

The light-shielding ratio Lsl1 of the pixel l1 can be calculated in the same way as the light shielding ratio Lsr1 of the pixel r1. Further, in the 3×3 pixel-mixture reading, light shielding ratios for the pixels r1 and l1, respectively, can be calculated in the same way.

For any pixel that contains the pixel outputs of two or more phase-difference detecting pixels, the light shielding ratio is calculated in accordance with whether the phase-difference detecting pixels differ in opening direction.

For the pixels r2 and l2 whose mixed pixel output does not contain the pixel output of any phase-difference detecting pixel different in opening direction, the light shielding ratio is calculated by first finding the light-shielding ratio for the case where the pixel outputs of two phase-difference detecting pixels are mixed and then converting this light-shielding ratio to the value for the case where the pixel output of one phase-difference detecting pixel is mixed. For example, the light-shielding ratio LSR12 of any phase-difference detecting pixel used to mix the pixel output of a pixel l2 shown in FIG. 8B is calculated by using the following equation (3), in view of the equation (2):

$$LSR12 = l2/N1 \quad (3)$$

where l2 is the pixel output of the pixel l2 and N1 is the pixel output of any pixel of the same color, arranged around the pixel l2.

The light-shielding ratio LSRr2 of the pixel r2 can be calculated in the same manner as the light-shielding ratio of LSR12 the pixel l2.

In the 2×2 pixel-mixture reading, for example, the outputs of two phase-difference detecting pixels may be 0.9 each, the outputs of two imaging pixels may be 1.0 each, and the outputs of four imaging pixels of the same color, surrounding each phase-difference detecting pixel, may be 1.0 each. If this is the case, the numerator is 3.8 (=0.9×2+1.0×2) and the denominator is 4 (=1.0×4). Hence, the light-shielding ratio LSR12 of the pixel l2 is 0.95.

The light-capturing ratio of any pixel is defined as (1-light-shielding ratio). Then, the light-capturing ratio LCR12 of the pixel l2 can be given by the following equation (4):

$$LCR12 = 1 - LSR12 \quad (4)$$

The larger the light-shielding ratio, the more it is difficult for light to enter on the pixel. Conversely, the larger the light-capturing ratio, the easier it is for light to enter on the pixel. The equation (4) gives the light capturing ratio attained in the case where two phase-difference detecting pixels are mixed. Hence, if one phase-difference detecting pixel is mixed, the light capturing ratio will be half the light-capturing ratio attained in the case where two phase-difference detecting pixels are mixed. Thus, the light-capturing ratio LCR1 of pixel 1 is given by the following equation (5):

$$LCR1 = LCR12/2 \quad (5)$$

Since the light-capturing ratio is defined as above, the light shielding ratio LSR1 of one pixel l is calculated in accordance with the following equation (6):

$$LSR1 = 1 - LCR1 \quad (6)$$

Next, also for the pixels rl1l, r112, r212 and r211 mixed with the pixel outputs of the phase-difference detecting pixels different in the opening direction, respectively, the light-shielding ratio of each pixel containing the pixel outputs of two phase-difference detecting pixels is calculated by using the equation (2), and the light-shielding ratio so calculated is converted to the value for the case where the pixel output of one phase-difference detecting pixel is contained. The light-shielding ratios of the right-open phase-difference detecting pixels are calculated independently of the light-shielding ratios of the left-open phase-difference detecting pixels. To calculate light-shielding ratios of the right-open phase-difference detecting pixels independently of those of the left-open phase-difference detecting pixels, simultaneous equations are set for the light-shielding ratios. The light-shielding ratios of, for example, the phase-difference detecting pixels r and 1 used to mix the pixels r211 and r112 shown in FIG. 8B are calculated as follows, in view of the equation (2):

$$LSRr211 = r211/N3$$

$$LSRr112 = r112/N3 \quad (7),$$

where r211 is the pixel output of the pixel r211, r112 is the pixel output of the pixel r112, and N3 is the pixel output of the pixel N3 of the same color, arranged around the pixels r211 and r112.

The light-shielding ratios of the other pixels can be calculated in the same way. The light-shielding ratio LSRr211 of the pixel r211 can be regarded as the sum of the light-shielding ratios of two pixels r and the light-shielding ratio of one pixel l, and the light-shielding ratio LSRr112 of the pixel r112 can be regarded as the sum of the light-shielding ratio of one pixel r and the light-shielding ratio of two pixels l. However, the numerator in the equation for calculating the light-shielding ratio of one pixel r or two pixels l does not include the output of any imaging pixel as in the equation (3) set forth above. In the 2×2 pixel-mixture reading, for example, the output of one phase-difference detecting pixel r may be 0.9, the outputs of two phase-difference detecting pixels l are 0.5 each, and the outputs of four imaging pixels of the same color, surrounding each phase-difference detecting pixel, may be 1.0 each. If this is the case, the light-shielding ratio of the pixel r is 0.225 (=0.9/4), the light-shielding ratio of the two pixels l is 0.25 (=0.5×2/4), and the light-shielding ratio LSRr112 of the pixel r112 is 0.475 (=0.225+0.25). Hence, the following simultaneous equations are valid:

$$\begin{pmatrix} 2 & 1 \\ 1 & 2 \end{pmatrix} \begin{pmatrix} LSRr \\ LSRl \end{pmatrix} = \begin{pmatrix} LSRr2/1 \\ LSRr1/2 \end{pmatrix} \quad (8)$$

The solution to the simultaneous equations (8) is given as follows:

$$\begin{pmatrix} LSRr \\ LSRl \end{pmatrix} = \begin{pmatrix} 2 & 1 \\ 1 & 2 \end{pmatrix}^{-1} \begin{pmatrix} LSRr2/1 \\ LSRr1/2 \end{pmatrix} \quad (9)$$

It has been explained how the light-shielding ratio is calculated in the 2×2 pixel-mixture reading and 3×3 pixel-mixture reading performed in this embodiment. Also, in any other reading modes, the light-shielding ratio is calculated by a similar method, provided that the number of pixel outputs of the phase-difference detecting pixels, which are mixed in each pixel output, is known prior to the calculation of the light-shielding ratio. If the number of pixel outputs mixed in the pixel output is unknown prior to the calculation of the light-shielding ratio, the number of pixel outputs of the phase-difference detecting pixels, which are mixed in each pixel output, must be calculated from the arrangement and reading scheme of the phase-difference detecting pixels provided in the imaging element 21.

As has been described, a complex process, such as solving simultaneous equations, must be performed on any pixel in which the output of a right-open phase-difference detecting pixel is mixed with the output of a left-open phase-difference detecting pixel. In order to reduce the calculation load, the light-shielding ratio of any pixel in which the outputs of a right-open and left-open phase-difference detecting pixels are mixed may not be calculated. In this case, the gain estimating process is performed by using only pixels in which the outputs of right-open and left-open phase-difference detecting pixels are not mixed at all.

The operation sequence of FIG. 6 will be further described. After the light-shielding ratio has been calculated, the image processing unit 31 determines if the pixels have been scanned, to determine whether or not the loop process has been completed. If it is determined by the image processing unit 31 that the loop process is not completed, it will be continued. If it is determined by the image processing unit 31 that the loop process is completed, it will be terminated. After the loop process has been performed, the correction-value converting unit 3131 of the gain correcting unit 313 performs a correction-value converting process (Step S108). The correction-value converting process is a process of calculating a gain correction value from the light-shielding ratio of one pixel r and the light-shielding ratio of one pixel l. The correction-value converting process will be explained below.

For any pixel in which the output of one phase-difference detecting pixel is mixed, the ratio calculated in Step S105 is used as the light-shielding ratio. For any pixel in which the outputs of two or more phase-difference detecting pixels are mixed, the light-shielding ratio is the average of the light-capturing ratios of the pixels whose outputs have been mixed. Assume that any imaging pixel has a light-capturing ratio of 1. Then, the light-shielding ratio LSRl2 of, for example, pixel l2 is calculated in accordance with the following equation (10):

$$LSRl2 = \frac{(1 - LSRl) \times 2 + (\text{number of mixed pixels} - 2)}{\text{Number of mixed pixels}} \quad (10)$$

Similarly, the light-shielding ratio LSRr2l1 of, for example, pixel r2l1 is calculated in accordance with the following equation (11):

$$LSRr2l1 = \frac{\begin{array}{c}(1 - LSRr) \times 2 + (1 - LSRl) + \\ (\text{number of mixed pixels} - 3)\end{array}}{\text{Number of mixed pixels}} \quad (11)$$

After the correction-value converting process has been performed, the gain multiplying unit 3132 of the gain correcting unit 313 performs a gain correcting process (Step S109). In the gain correcting process, the pixel output of any phase-difference detecting pixel is multiplied by the gain-correction value calculated from the light-shielding ratio obtained in Step S108, i.e., correction-value converting process. The reduction in light amount is thereby compensated for, in the pixel in which the pixel output of the phase-difference detecting pixel is mixed. The image is thereby corrected in terms of quality.

After the gain correcting process has been performed, the interpolation determining unit 314 determines the application ratio of the pixel output of the phase-difference detecting pixel which has been corrected by the gain correcting unit 313 (Step S110). As described above, the application ratio is the weighting coefficient used in a weighted addition of adding the gain-corrected pixel data output from the phase-difference detecting pixel (i.e., pixel containing the pixel output of the phase-difference pixel if pixel mixture has been performed) to the pixel data output from the imaging pixels around the phase-difference detecting pixel (i.e., pixel not containing the pixel output of the phase-difference detecting pixel if the pixel mixture has been performed). For any pixel containing the pixel output of a right-open phase-difference detecting pixel and the pixel output of a left-open phase-difference detecting pixel, but not gain-corrected, the application ratio of interpolated pixels (i.e., adjacent pixels) is 1. After the interpolation determining unit 314 has determined the application ratio, the interpolating unit 315 performs interpolation (weighted addition) on the output of the phase-difference detecting pixel (i.e., pixel containing the output of the phase-difference detecting pixel if the pixel mixture has been performed) and on the pixel outputs of the imaging pixels around the phase-difference detecting pixel (i.e., pixel not containing the output of the phase-difference detecting pixel if the pixel mixture has been performed), in accordance with the application ratio determined by the interpolation determining unit 314 (Step S111).

After the interpolation has been performed, the image processing unit 31 performs a post-interpolation imaging process (Step S112). After the imaging process has been performed, the CPU 29 records, in the recording medium 45, the image data generated in the imaging process and then temporarily stored in the DRAM 41 (Step S113). Next, the CPU 29 determines whether the video recording should be stopped or not (Step S114). More precisely, the CPU 29 determines whether the release button of the console 19 has been pushed again. If the release button has been pushed again, the CPU 29 determines that the video recording must be stopped.

In Step S114, the CPU 29 may not determine that the moving picture recording should be stopped. In this case, the CPU 29 returns the process back to Step S101, whereby the video recording is continued. If the CPU 29 determines in Step S114 that the video recording must be stopped, it terminates the process of FIG. 5.

As has been described, the gain correction value is calculated for each mixed pixel from the number of pixel outputs of the phase-difference detecting pixels, which are mixed, which number accords with the read mode and the arrangement of the phase-difference detecting pixels in the imaging element 21. Hence, the image-quality decrease due to the phase-difference detecting pixels can be suppressed, regardless of the read mode and the arrangement of the phase-difference detecting pixels.

The method of calculating the light-shielding ratio, described above, is no more than an example. The light-shielding ratio can be calculated by a combination of the basic arithmetic operations.

In the embodiment described above, the light-shielding ratio is calculated from the number of outputs of the phase-difference detecting pixels, which are mixed in the mixed outputs of the pixels. Instead, the light-shielding ratio may be calculated from the number of outputs of the imaging-pixel outputs, which are mixed in the outputs of the pixels. Since the number of mixed outputs of imaging pixels is (all pixels involving the output mixture)−(phase-difference detecting pixels whose outputs are mixed), the light-shielding ratio can be calculated by using the equations described above.

The processes performed in the embodiment as described above can be stored in the form of programs that the CPU 29 can execute. The programs may be stored in the storage medium provided in an external storage device, such as a memory card (e.g., ROM card, RAM card, etc.), a magnetic disk (e.g., hard disk), an optical disk (e.g., CD-ROM, DVD, etc.) or a semiconductor memory. In this case, the CPU 29 may read the programs from the storage medium provided in the external storage device and may then be controlled by the programs so read, and can therefore perform the processes described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus designed to process pixel outputs of an imaging element including imaging pixels and phase-difference detecting pixels, the apparatus comprising:
    a pixel mixing unit configured to mix the pixel outputs; and
    an image processing unit configured to correct mixed pixel outputs that include outputs of the imaging pixels and outputs of the phase-difference detecting pixels to prevent the mixed pixel outputs from degrading image quality, by using at least one of information selected from a group consisting of the number of mixed pixel outputs of phase-difference detecting pixels having the same opening direction and the number of mixed pixel outputs of imaging pixels having the same opening direction.

2. The image processing apparatus according to claim 1, wherein the image processing unit includes a gain correcting unit configured to correct a gain of the mixed pixel outputs including the outputs of the imaging pixels and the outputs of the phase-difference detecting pixels.

3. The image processing apparatus according to claim 2, wherein the image processing unit includes a gain estimating unit configured to estimate a gain-correction value for correcting, in the gain correcting unit, the pixel output of the phase-difference detecting pixel, to prevent the phase-difference detecting pixels from degrading image quality, by using at least one of the information selected from the group consisting of the number of mixed pixel outputs of phase-difference detecting pixels having the same opening direction and the number of mixed pixel outputs of imaging pixels having the same opening direction.

4. The image processing apparatus according to claim 1, wherein the information about the number of mixed pixel outputs of phase-difference detecting pixels having the same opening direction and the information about the number of mixed pixel outputs of imaging pixels having the same opening direction are determined from the arrangement of the phase-difference detecting pixels and a pixel-mixing method used by the pixel mixing unit.

5. The image processing apparatus according to claim 4, wherein the pixel-mixing method is determined from an image displaying mode or an image recording mode.

6. The image processing apparatus according to claim 3, wherein the gain estimating unit estimates the gain-correction value, without using the pixel outputs of the phase-difference detecting pixels having different opening directions, if the mixed pixel outputs include the outputs of the phase-difference detecting pixels having different opening directions.

7. The image processing apparatus according to claim 3, wherein if the mixed pixel outputs include the outputs of the phase-difference detecting pixels having different opening directions, the gain estimating unit first uses simultaneous equations to calculate light-shielding ratios of the phase-difference detecting pixels, and then estimates the gain-correction value.

8. The image processing apparatus according to claim 3, wherein if the mixed pixel outputs include the outputs of the phase-difference detecting pixels having different opening directions, the gain estimating unit first uses basic arithmetic operations to calculate light-shielding ratios of the phase-difference detecting pixels, and then estimates the gain-correction value.

9. An image processing method designed to process pixel outputs of an imaging element having imaging pixels and phase-difference detecting pixels, the method comprising:
    mixing the pixel outputs; and
    correcting mixed pixel outputs that include outputs of the imaging pixels and outputs of the phase-difference detecting pixels to prevent the mixed pixel outputs from degrading image quality, by using at least one of information selected from a group consisting of the number of mixed pixel outputs of phase-difference detecting pixels having the same opening direction and the number of mixed pixel outputs of imaging pixels having the same opening direction.

10. The image processing method according to claim 9, wherein the pixel outputs are corrected by means of gain correction.

11. The image processing method according to claim 10, wherein the pixel outputs are corrected by using at least one of information selected from the group consisting of the number of mixed pixel outputs of phase-difference detecting pixels having the same opening direction and the number of mixed pixel outputs of imaging pixels having the opening direction and then estimating a gain-correction value for correcting the pixel output of any phase-difference detecting pixel, thereby to prevent the mixed pixel outputs including outputs of the imaging pixels and outputs of the phase-difference detecting pixels from degrading image quality.

* * * * *

UNITED STATES PATENT AND TRADEMARK OFFICE
CERTIFICATE OF CORRECTION

| | | |
|---|---|---|
| PATENT NO. | : 9,467,629 B2 | Page 1 of 1 |
| APPLICATION NO. | : 14/507178 | |
| DATED | : October 11, 2016 | |
| INVENTOR(S) | : Atsuro Okawaza et al. | |

It is certified that error appears in the above-identified patent and that said Letters Patent is hereby corrected as shown below:

On the Title Page

Please insert:
--(30) Foreign Application Priority Data: JP 2013-212284, filed October 9, 2013--

Signed and Sealed this
First Day of August, 2017

Joseph Matal
*Performing the Functions and Duties of the*
*Under Secretary of Commerce for Intellectual Property and*
*Director of the United States Patent and Trademark Office*